(12) United States Patent
Suzuki

(10) Patent No.: US 6,493,763 B1
(45) Date of Patent: *Dec. 10, 2002

(54) MULTIMEDIA COMMUNICATION SYSTEM AND COMMUNICATING APPARATUS

(75) Inventor: Toshiaki Suzuki, Kawaguchi (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/670,582

(22) Filed: Jun. 26, 1996

(30) Foreign Application Priority Data

| Jun. 29, 1995 | (JP) | 7-164220 |
|---|---|---|
| Jun. 29, 1995 | (JP) | 7-164221 |
| Jun. 30, 1995 | (JP) | 7-166234 |
| Jul. 28, 1995 | (JP) | 7-193587 |

(51) Int. Cl.[7] .............................................. G06F 15/16
(52) U.S. Cl. .......................... 709/231; 705/14; 705/52; 380/231
(58) Field of Search ................ 395/200.76, 200.61, 395/200.64, 200.59, 188.01; 340/825.06, 825.15, 825.34; 345/327, 115, 127; 707/200; 705/34–39, 26, 27, 51–53; 348/3, 8; 364/131; 709/246, 231, 234, 229; 713/202; 380/231

(56) References Cited

U.S. PATENT DOCUMENTS

| 4,642,758 A |   | 2/1987 | Teng | 364/200 |
|---|---|---|---|---|
| 4,850,007 A |   | 7/1989 | Marino et al. | 379/67 |
| 5,105,184 A | * | 4/1992 | Pirani et al. | 340/721 |
| 5,333,186 A |   | 7/1994 | Gupta | 379/201 |
| 5,448,625 A | * | 9/1995 | Lederman | 379/112 |
| 5,604,542 A | * | 2/1997 | Dedrick | 348/552 |
| 5,634,012 A | * | 5/1997 | Stefik et al. | 395/239 |
| 5,659,845 A | * | 8/1997 | Krist et al. | 399/79 |
| 5,696,906 A | * | 12/1997 | Peters et al. | 395/234 |
| 5,710,884 A | * | 1/1998 | Dedrick | 709/217 |
| 5,712,979 A | * | 1/1998 | Graber et al. | 709/218 |
| 5,715,403 A | * | 2/1998 | Stefik | 395/244 |
| 5,729,279 A | * | 3/1998 | Fuller | 348/8 |
| 5,732,216 A | * | 3/1998 | Logan et al. | 709/203 |
| 5,740,231 A | * | 4/1998 | Cohn et al. | 709/206 |
| 5,751,282 A | * | 5/1998 | Girard et al. | 345/327 |
| 5,759,101 A | * | 6/1998 | Von Kohorn | 463/40 |
| 5,768,353 A | * | 6/1998 | Browne | 379/114 |
| 5,933,811 A | * | 8/1999 | Angles et al. | 705/27 |
| 5,987,424 A | * | 11/1999 | Nakamura | 705/14 |

FOREIGN PATENT DOCUMENTS

| EP | 0656728 | 6/1995 |
|---|---|---|
| JP | 62-11991 | 1/1987 |
| JP | 62-54646 | 3/1987 |
| JP | 62-169493 | 7/1987 |
| JP | 63-299453 | 12/1988 |
| JP | 1-231490 | 9/1989 |
| JP | 2-115316 | 4/1990 |
| JP | 4-61463 | 2/1992 |
| JP | 4-324784 | 11/1992 |
| JP | 6-44170 | 2/1994 |
| JP | 6-46175 | 2/1994 |
| JP | 7-203420 | 8/1995 |
| JP | 7-231440 | 8/1995 |
| WO | WO9401964 | 1/1994 |
| WO | WO9624213 | 8/1996 |

OTHER PUBLICATIONS

SMPTE Journal, vol. 102, No. 9, pp. 791–803, Sep. 1993.

* cited by examiner

Primary Examiner—Mark H. Rinehart
Assistant Examiner—Marc D. Thompson
(74) Attorney, Agent, or Firm—Fitzpatrick, Cella, Harper & Scinto

(57) ABSTRACT

A multimedia communication system is constructed by a terminal device for user which is used for the user to receive information, a terminal device for information provider which is used by an information provider to provide the information to the user, a network to which each of the terminal devices is connected, and a reservation unit for circulating a reservation table to select and reserve the information that is received by the user and a reception time between the terminal device for information provider and the terminal device for user.

14 Claims, 4 Drawing Sheets

MULTIMEDIA COMMUNICATION SYSTEM AND COMMUNICATING APPARATUS

BACKGROUND OF THE INVENTION

1. Field of the Invention

The invention relates to a multimedia communication system and communicating apparatus for transmitting information such as motion image data, still image data, audio data, computer data, etc. and, more particularly, to an accounting for information which is provided.

2. Related Background Art

In recent years, various communication networks such as installation of an optical fiber network in a trunk line system communication network, actualization of B-ISDN using such an optical fiber network, spread of a cable system, realization of a practical use of a communication satellite, spread of a local network, etc. have been rapidly spread. Their mutual connection is also actively being performed.

On the other hand, not only character data but also information which is so called a multimedia such as still image, audio signal, motion picture, etc. is being exchanged in a worldwide scale.

In such a situation, an information service industry using the multimedia information network is also rapidly being enlarged. For example, the following information services have been developed and progressed by using the multimedia information network as a prerequisite.

(1) Video-on-demand such that a video library is accessed from a terminal and a desired video can be selected and enjoyed (2) Game network such that a desired game is selected from a game library and is played together with a person existing at a remote location (3) Information retrieval services such that various data bases are accessed and necessary information is called (4) A desired article is retrieved and purchased from hundreds of thousand of items (5) Viewer participation TV such that the user participates (6) TV conference such that persons existing at remote locations progress a consultation while sharing references.

To realize a practical use of those services, an accounting technique such that "a compensation of the services used is certainly handed to a provider of the services" occupies an important position. Particularly, in case of considering a problem regarding a copyright such as an illegal copy of information, a software, or the like, whether the compensation has correctly accounted or not is a vital question for information service industries when the above multimedia information network is used as a prerequisite.

However, in many cases, a conventional accounting method is a monthly accounting method that is not concerned with a use frequency as in a cable television system or a satellite broadcasting or an accounting method whereby only a use frequency (or using time) which is not concerned with the kind or quality of information is counted as in a use services of a computer.

According to the conventional accounting methods which don't depend on the kind or quality of information and services as mentioned above, it is difficult to cope with a variety of information and services which are presumed such that they will be further widespread in future. It is an important problem to accurately perform an accounting.

When a number of users and a number of information providers exist on the network, the channel on the network is likely to be busy, so that there is a problem such that it is difficult to receive information of the user.

SUMMARY OF THE INVENTION

The invention is made in consideration of the above circumstances and it is an object of the invention to provide a multimedia communication system and a communicating apparatus which can certainly receive information received by the user and can accurately perform an accounting.

According to an embodiment of the invention, there are provided: a terminal device for user which is used for the user to receive information; a terminal device for information provider which is used by an information provider to provide the information to the user; a network to which each of the terminal devices is connected; and reserving means for circulating a reservation table to select and reserve the information which is received by the user and a reception time between the terminal device for information provider and the terminal device for user.

According to another embodiment, there are provided: communicating means for user which is used for the user to receive information; communicating means for information provider for providing the information to the user; and reserving means for circulating a reservation table to select and reserve the information which is received by the user and a reception time between the communicating means for information provider and the communicating means for user.

According to still another embodiment, there are provided: receiving means for receiving reservation information from another terminal device on the network; and transmitting means for transmitting predetermined information on the basis of the reservation information.

According to the above embodiment, each user reserves the information to be received and the reception time on the basis of the circulated reservation table, so that the information can be certainly transmitted to the user and an accounting can be performed on the basis of the reservation. An accounting system can be also changed in accordance with the kind of information to be transmitted and the time.

According to further another embodiment of the invention, there are provided: a terminal device for user which is used for the user to receive information; a terminal device for information provider which is used by the information provider to provide the information to the user; a terminal device for sponsor which is used by the sponsor of the additional information; a network to which each of the terminal devices is connected; and accounting means for accounting an amount of money according to the additional information received by the user to the sponsor.

According to further another embodiment, there are provided: receiving means for receiving information through the network by the user; and selecting means for selecting whether the additional information which is added to the information is received or not.

According to further another embodiment, there is provided a terminal device for information provider which is used in a communication system in which the information provider transmits information through the network in accordance with a request from a receiver, wherein inserting means for inserting additional information into the information in accordance with a request of the receiver is provided.

According to further another embodiment, there is provided a terminal device for information provider which is used by the information provider to provide information in accordance with a request of a receiver, wherein there is provided accounting means such that when additional information other than the information requested by the receiver is received, an amount of money according to the additional information is accounted to the terminal device which transmitted the additional information.

According to the above embodiment, when the user receives the additional information, since the accounting means accounts to the sponsor, a burden of the user is reduced and the additional information is used even for the sponsor, a fair and accurate accounting can be performed for both of the user and the sponsor.

According to further another embodiment of the invention, there are provided: a terminal device for user which is used for the user to receive information; a terminal device for information provider which is used by the information provider to provide the information to the user; a network to which each of the terminal devices is connected; and accounting means for accounting an amount of money according to the number of times of reception of the same information by the user to the user.

According to further another embodiment, there are provided: a terminal device for user which is used for the user to receive information; a terminal device for information provider for transmitting information in which additional information was inserted to a predetermined channel without receiving any request from the user and for transmitting information according to a request of the user to another channel; and a network to which each of the terminal devices is connected.

According to further another embodiment, there are provided: receiving means for receiving information and additional information which is added to the information; and accounting means for accounting an amount of money according to the additional information for the information which was received to the provider of the additional information.

According to further another embodiment, there is provided communicating means for information provider for transmitting the information to which the additional information was inserted to the communicating means for user through a predetermined channel without receiving any request of the user and for transmitting the information according to the request of the user to the communicating means for user through another channel.

According to the above embodiment, since an amount of money according to the number of times of reception of the information is accounted to the user, the accurate accounting can be performed.

Since the information to which the additional information was inserted is always transmitted to the predetermined channel of the network, the user passively receives the information. Since the information is transmitted to the other channel only when the user requests it, the user actively receives the information.

According to further another embodiment of the invention, there are provided: a terminal device for user which is used for the user to receive information; a terminal device for information provider which is used by the information provider to provide the information to the user; a network to which each of the terminal devices is connected; and accounting means for accounting an amount of money according to the information received by the user to the user and for subtracting the accounting amount of money when the number of times of reception of the same information by the same user is equal to or larger than a predetermined number of times.

According to further another embodiment, there are provided: communicating means for information provider for providing information to the user; and accounting means for accounting an amount of money according to the information received by the user and for subtracting an accounting amount of money when the number of times of reception of the same information by the same user is equal to or larger than a predetermined number of times.

According to the above embodiment, the accounting means accounts the amount of money according to the number of times of reception of the information of the user to the user and, when the user receives the same information by a number of times larger than a predetermined number of times of reception, the accounting means subtracts the amount of money and accounts. Thus, the reception of the information of the user can be further promoted.

DETAILED DESCRIPTION OF THE PREFERRED EMBODIMENTS

An embodiment of the invention will now be described hereinbelow.

Figure 1:
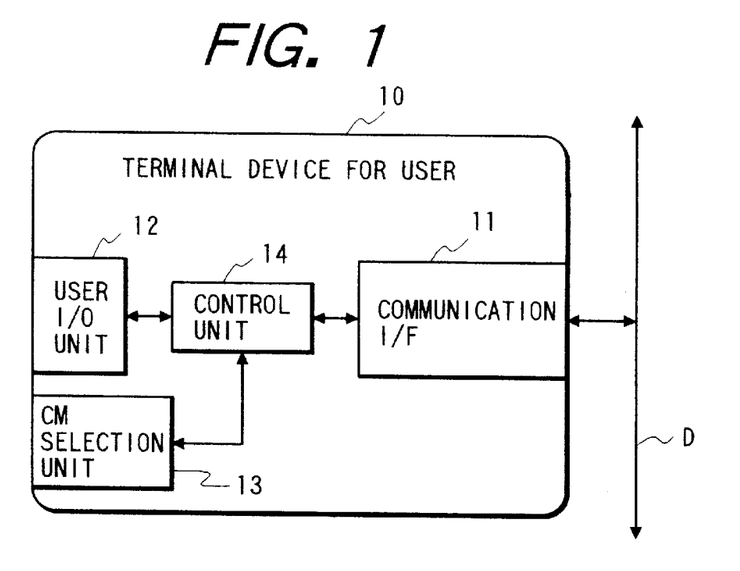
FIG. 1 is a block diagram showing an embodiment of a terminal device for user.

FIG. 1 shows an embodiment of a terminal device 10 for user which is used by the user in a multimedia network. The terminal device 10 has: a communication interface 11 for communicating with the outside through various transmission paths D such as an internet and the like; a user input/output unit 12 for performing the operations such as display of a transmitted signal to a display (not shown), designation of a signal channel, and the like; a CM selection unit 13 for designating the selection of the presence or absence of a reception of a commercial advertisement (hereinafter, simply referred to as a CM) as additional information by the user by using a keyboard, a switch, or the like; and a control unit 14 for performing a signal conversion such that the digital signal transmitted from the communication I/F 11 is converted to the analog signal or a selection of the signal in accordance with the designation of the user I/O unit 12 or CM selection unit 13.

The terminal device 10 executes the input and output of the user and, particularly, the user sets whether the CM is received or not into the CM selection unit 13, so that the terminal device 10 can select through the control unit 14 and communication interface 11. In particular, in case of a video-on-demand or the like, the result of the selection of the CM of the user is previously sent to the information provider through the communication I/F 11 together with the result of the designation of the request information. The information provider executes a process for judging whether the CM is inserted into the inherent information or not.

Figure 2:
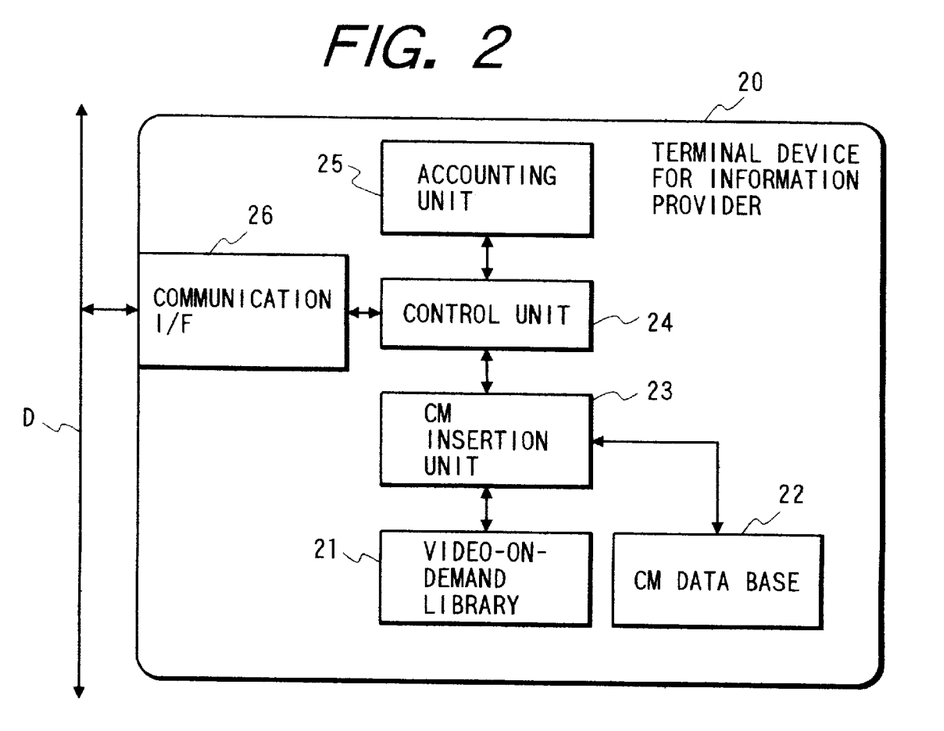
FIG. 2 is a block diagram showing an embodiment of a terminal device for information provider.

FIG. 2 shows an embodiment of a terminal device 20 for information provider which is used by the information provider in the multimedia network.

The terminal device 20 is constructed by: a video-on-demand library 21 for holding a number of video works; a CM data base 22 for holding a number of CMs; a CM insertion unit 23 for inserting a desired CM into the video work in response to a request of the user; a control unit 24 for searching a desired work from the video-on-demand library 21 or the data base 22 of the CM by a request of the user or controlling the insertion of the CM; an accounting unit 25 for accounting to the user and sponsor by the control of the control unit 24 in accordance with the presence or absence of the CM; and a communication interface 26 for exchanging information between the transmission path D and control unit 24.

The terminal device 20 transmits information mainly consisting of video images to the user through the communication I/F 26 in accordance with the designation of the user. When the insertion of the CM is designated by the user, the video image and audio sound of the CM are extracted from the CM data base 22 by a management of the control unit 24 and are inserted into a video-on-demand signal at a proper timing by the CM insertion unit 23. Upon the user thus enjoying the work in which the CM was inserted, an amount of money according to the video-on-demand work is accounted to the sponsor by the accounting unit 25. The user can enjoy the video product by a free account or an account of an amount cheaper than that in case of no CM.

When the user doesn't select the CM, the information of the video image and audio sound of the video-on-demand is transmitted as it is by the management of the control unit 24. In this case, the amount of money according to the video-on-demand work is accounted to the user by the accounting unit 25 for the terminal device 10 for user connected to the communication I/F 26.

Figure 3:
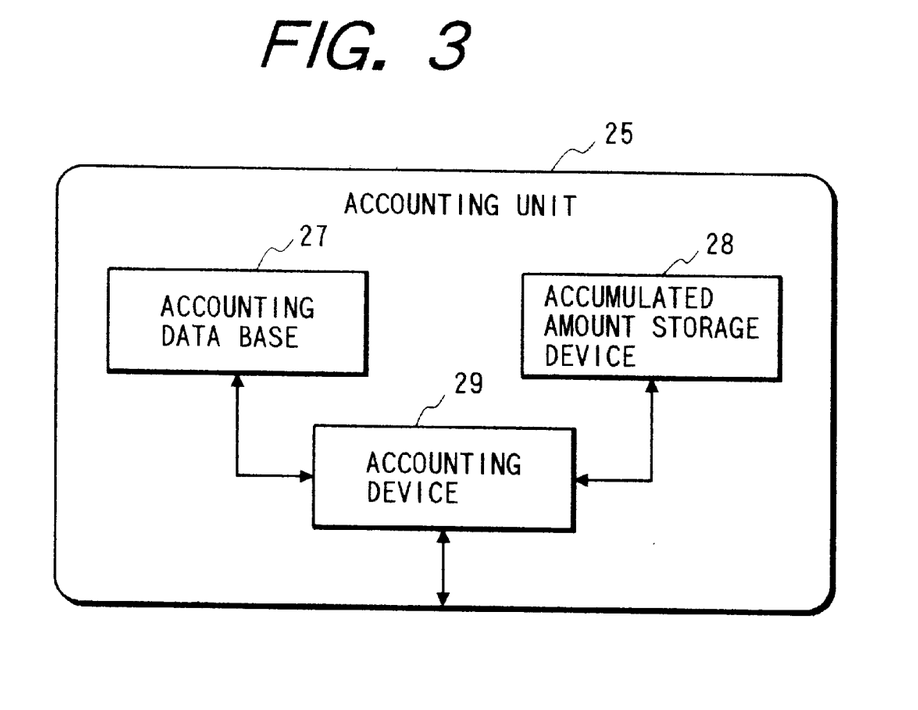
FIG. 3 is a block diagram showing an embodiment of an accounting unit of the terminal device for information provider.

As shown in FIG. 3, the accounting unit 25 comprises an accounting data base 27, an accumulated amount storage device 28, and an accounting device 29. An objective person of the accounting and the kind of services are informed to the accounting unit 25 by the control unit 24. The accumulated amount of money of the objective person is read out from the accumulated amount storage device 28 to the accounting device 29. The amount of money according to the kind of services is calculated by the accounting device 29 on the basis of the accounting data base 27 and is informed to the sponsor through the communication I/F 26. In case of paying an amount of money each time, the accumulated amount storage device 28 can be omitted. An account is charged to each of the user and the sponsor.

Figure 4:
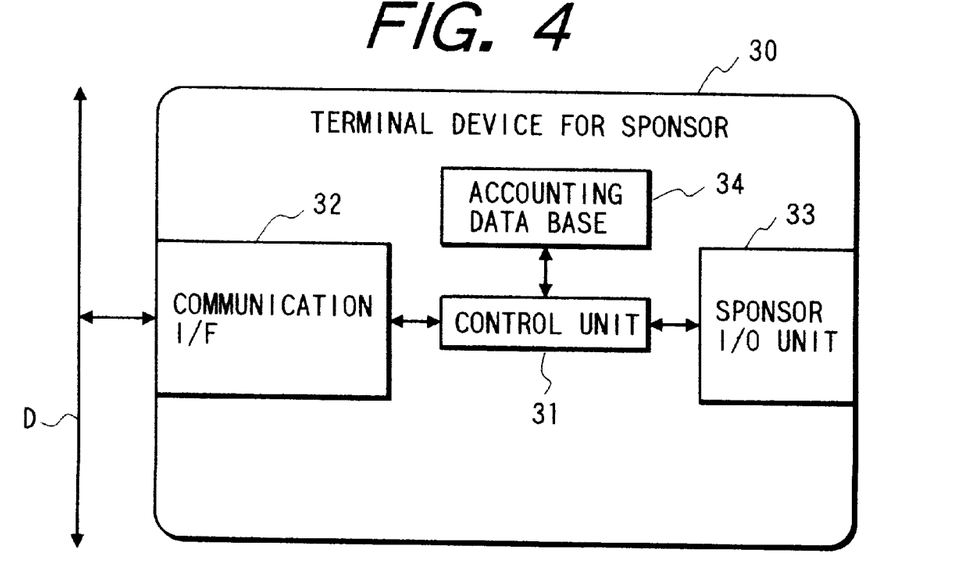
FIG. 4 is a block diagram showing an embodiment of a terminal device for sponsor.

FIG. 4 shows an embodiment of a terminal device 30 for sponsor which is used by the sponsor in the multimedia network.

The terminal device 30 is constructed by: a communication interface 32 for exchanging information between the transmission path D and a control unit 31; the control unit 31 for controlling the communication I/F 32 and a sponsor input/output unit 33; and the sponsor I/O unit 33 which is used for the sponsor to display or change an accounting amount of money. Further, an accounting data base 34 for storing a requested accounting amount from each information provider and an accounting amount of each CM as necessary is added to the terminal device 30.

In the above construction, when there is a request for accounting from the information provider through the communication I/F 32, the information is outputted to the sponsor I/O unit 33 and informs the sponsor of the details of the account. In case of having the accounting data base 34, the accounting request from each information provider and the accounting amount of each CM can be also stored.

Figure 5:
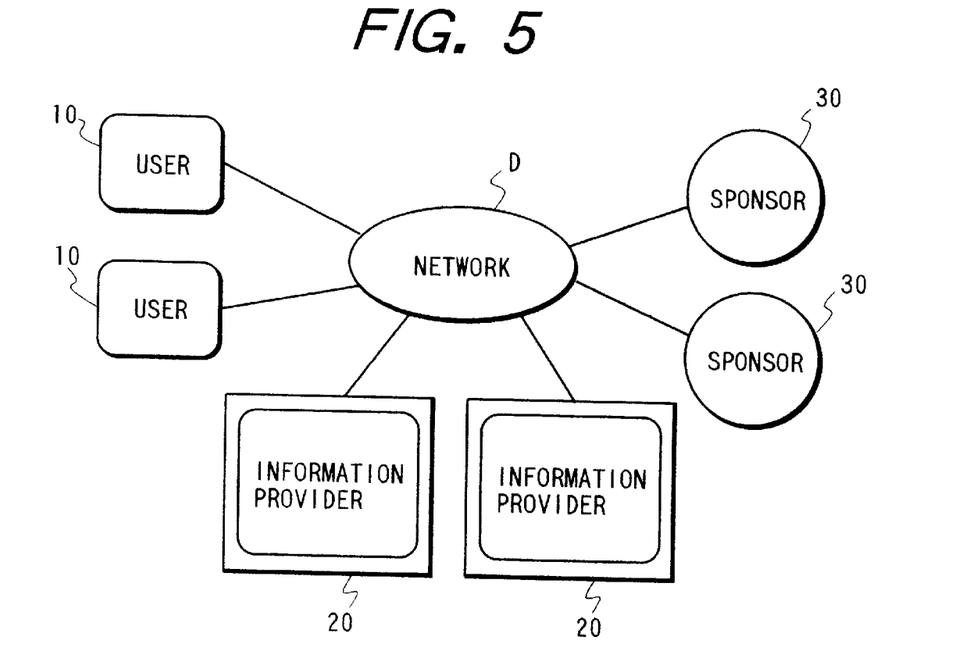
FIG. 5 is a block diagram showing an embodiment of a multimedia communication system.

FIG. 5 shows a multimedia communication system constructed by connecting the foregoing terminal devices 10, 20, and 30 to the transmission system D. In the example shown in the diagram, a case where every two terminal devices 10, 20, and 30 are used is shown. However, at least one or more terminal devices can be also used as each of the terminal devices 10, 20, and 30. For example, an ATM network is used as a transmission system D. In the following description, for easy understanding of the description, the terminal devices 10, 20, and 30 are respectively simply called user 10, information provider 20, and sponsor 30.

In the above construction, when services with CM of video-on-demand are requested from a certain user 10 to one information provider 20, the user 10 first connects to the information provider 20 and requests the video-on-demand with CM. Subsequently, the information provider 20 inserts the CM from the CM data base 22 into the video information from the video-on-demand library 21 by the CM insertion unit 23 and sends the resultant video information to the user 10. The accounting unit 25 of the information provider 20 notifies the sponsor 30 of the account data and charges the accounting amount. In this instance, when the amount of money of the fee is not the responsibility of the sponsor 30, a part of the account is also charged to the user 10.

When the user 10 requests services without CM, the user 10 connects to the information provider 20 and requests the video-on-demand without CM. Subsequently, the video information of the video-on-demand library 21 is sent from the information provider 20 to the user 10. The account data of the accounting unit 25 of the information provider 20 is notified to the user 10 and the accounting amount is charged.

When the user 10 requests services with CM, the information provider 20 can also change the accounting amount to be charged to the sponsor 30 in accordance with a frequency of the number of times of watching. In such a case, it is sufficient to set the accounting amount into the accounting data base 27 in accordance with the watching frequency. Further, it is also possible to construct in a manner such that when the watching frequency of the user 10 for the same services exceeds a certain watching frequency, an upper limit is provided for the accounting amount. Namely, when the watching frequency is equal to or larger than a certain number of times, the accounting amount is set to zero. Such a number of times can be also set to one time as necessary.

The invention can cope with the case where an amount of information to the user 10 exceeds a capacity of a communication channel of the transmission system D. Namely, a vacant situation of the transmission path is notified to the user 10 and a time at which the transmission path is free and a program are reserved, thereby reducing a load of the transmission path.

For this purpose, the information provider 20 circulates a reservation table shown in Table 1 in which program names, broadcasting times, and the like have been written to the transmission system D.

TABLE 1

Reservation Table

| Time | Channel 1 | Channel 2 | Channel 3 |
| --- | --- | --- | --- |
| 6:00- | | | |
| 8:00- | | | |
| 10:00- | | Program 2, User 2 | |
| 12:00- | | User 3 | |
| 14:00- | | | Program 3, User 4 |
| 16:00- | | | User 1 |
| 18:00- | Program 1, User 1 | | |
| 20:00- | | | |
| 22:00- | | | |

Each user 10 writes the name which is peculiar to the user and a program to be watched by the user I/O unit 12 by a free channel in a free time and returns them to the information provider 20 through the communication I/F 11. The information provider 20 periodically checks the reservation table by the control unit 24 and transmits the program in accordance with the reservation written in the reservation table. The user 10 watches the reserved program. The information provider 20 charges the accounting amount corresponding to the received program to the user. When there is a sponsor, the user 10 can also designate the presence or absence of the selection of CM into the reservation table. In this case, the accounting amount is charged to the sponsor or user 10.

When there is no sponsor 30 on the transmission system D, since there is no additional information, the CM selection unit 13 in the user 10 can be omitted and the CM insertion unit 23, CM data base 22, and the like in the information provider 20 can be also omitted. In case of using the ATM network as a transmission system D, the reservation table can be also constructed by an ATM cell, packet, or the like.

According to the invention as described above, by circulating the reservation table to the user, on the basis of the reservation, each user can certainly transmit the desired information at a desired time. The accounting and management can be also easily certainly performed on the basis of the reservation table.

The accounting system can be changed in accordance with the kind and time of the information to be transmitted. For example, an extra fee can be also charged to a popular movie or the transmission at a prime time.

According to the above embodiment, since the accounting amount is charged to the sponsor in accordance with the additional information such as CM or the like received by the user, when the person who uses the additional information such as CM or the like by the multimedia receives or uses such information, the accounting amount can be charged to the sponsor as an information transmitter without charging to the user. Therefore, the user can obtain information more conveniently, a fair and proper fee system can be realized, and a quality of services of the multimedia network can be improved.

In the above description, the case where the user first requests and the information provider transmits information in accordance with the request irrespective of the presence or absence of the CM has been shown. However, even if the fee becomes free when the user watches the CM, the user cannot obtain the information so long as he doesn't always actively request the information. However, the actual user is not always active and there is also a situation such that information can be obtained like a CM or may be passive. On the other hand, the sponsor has a request such that he wants the user to watch the CM even if he pays a fee. Therefore, with respect to only the CM such that the sponsor pays the whole amount of money, if it is constructed such that the information provider always broadcasts the information with CM irrespective of the absence of the request of the user, the requests of both of the passive user and the sponsor can be satisfied. However, if such information with CM is always broadcasted in all of the channels of the network, a request of the user such that he actively wants to obtain information cannot be satisfied.

Therefore, while information with CM is always broadcasted by several channels, information is provided by the other channels in accordance with a request of the user.

In FIG. 5, a case where the information provider 20 always broadcasts information with CM will be first described. Although the constructions of FIG. 2 of the information provider 20 in such a case and the information provider 20 in the foregoing description are identical, their operations slightly differ.

Namely, in the above description, although the information provider 20 has transmitted information in response to the transmission request from the user 10, in the invention, even if there is no request from the user 10, the information provider 20 always broadcasts the information for which the sponsor 30 pays the whole accounting amount by several channels.

In this case, the information provider 20 is not limited to one provider but may be a plurality of providers. The user 10 receives the broadcast on an ATM network in which the CM by the information provider 20 was inserted. In this case, the accounting amount is charged to the sponsor 30 in accordance with the number of times of the broadcasting of the CM or the like. The information to be broadcasted can be selected in response to a request from the sponsor 30 or can be also selected by the information provider 20 himself. The information to be broadcasted can be also determined by an audience rating, a result of a questionnaire, or the like.

A case where the user 10 requests information without CM or information in which the whole accounting amount is not charged to the sponsor 30 will now be described.

The user 10 requests a video-on-demand without CM to the information provider 20 by using a channel which is free at present. Subsequently, the information provider 20 stops the insertion of the CM in the CM insertion unit 23 as information of such a channel and sends video information of the video-on-demand library 21 to the user 10. In this instance, the other several channels always continuously broadcast the information in which the CM was inserted in a manner similar to the case where there is no request from the user 10. A fee according to the information requested by the user 10 is charged to the user 10 by the accounting unit 25 of the information provider 20. The user 10 can also obviously freely select a desired channel.

As mentioned above, the construction such that information is transmitted only when there is a request from the user 10 is not used, by always transmitting information with CM by several channels, a request of the passive user 10 for the information can be satisfied. By providing the information requested by the user through another channel, a request of the active user can be also satisfied. By previously knowing a part of the information by the passive user 10, an opportunity to actively select the information increases. The CM can be also watched by a number of users 10 for the sponsor 30.

According to the embodiment as described above, since the accounting amount according to the number of times of the reception of the information by the user is charged to the user, the accounting to the user in the multimedia network can be correctly performed.

According to the other embodiment, by providing the channel which always broadcasts the information in which the additional information was inserted and the channel for broadcasting the information only when there is a request of the user, the user can passively receive the information or can actively receive desired information.

By charging to the sponsor of the channel which always broadcasts the information in which the additional information was inserted, the accounting amount can be charged to the sponsor as an information transmitter without charging to the user. Therefore, the user can get the information by a lighter burden and a quality of services of the multimedia network can be improved. When the user doesn't want to receive the additional information, the user can stop the transmission of the additional information by paying a reception fee by a selection of the user.

Figure 6:
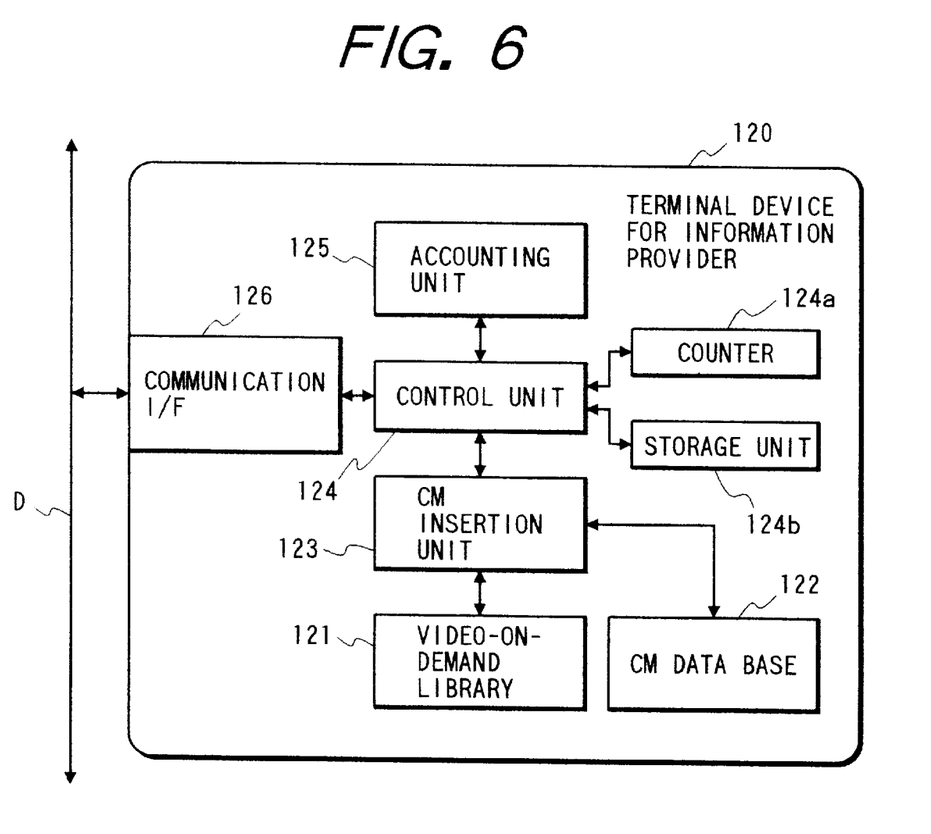
FIG. 6 is a block diagram showing another embodiment of a terminal device for information provider.

FIG. 6 shows another embodiment of a terminal device 120 for information provider which is used by the information provider in the multimedia network.

The terminal device 120 is constructed by: a video-on-demand library 121 for holding a number of video works; a CM data base 122 for holding a number of CMs; a CM insertion unit 123 for inserting a CM into the video work by a request of the user; a control unit 124 for retrieving a desired work from the video-on-demand library 121 or the data base 122 of CM by a request of the user or for controlling the insertion of the CM; an accounting unit 125 for accounting to the user and the sponsor by the control of the control unit 124 in accordance with the presence or absence of the CM; a communication interface 126 for exchanging information between the transmission path D and control unit 124; a counter 124a for counting the number of times of the reception of the same program by the same user; and a storage unit 124b for storing a count value of the counter 124a.

The terminal device 120 transmits information mainly consisting of a video image to the user through the communication I/F 126 in accordance with the designation of the user. When the insertion of a CM is designated by the user, a video image and an audio sound of the CM are extracted from the CM data base 122 by the management of the control unit 124 and are inserted into a video-on-demand signal at a proper timing by the CM insertion unit 123. In case of watching the work in which the CM was inserted, an accounting amount according to the video-on-demand work is charged to the sponsor by the accounting unit 125. The user can watch the work by a free fee or a fee of an amount cheaper than that in case of the absence of an advertisement.

When the user doesn't select the CM, the information of the video image and audio sound of the video-on-demand is transmitted as it is by the management of the control unit 124. In this case, in the accounting unit 125, an amount of money according to the video-on-demand work is charged to the user for the terminal device 10 for user connected to the communication I/F 126.

According to the above embodiment, when the user 10 repetitively watches the same information, the accounting amount is reduced. Thus, a further watching by the user can be promoted.

Namely, as shown in FIG. 6, the information provider 120 has the counter 124a to count the number of times of the watching of the same program by each user 10 and the storage unit 124b for storing its count value. Further, in this case, a reduction amount corresponding to the number of times of the watching of the same program is recorded in the accounting data base 27 in FIG. 3 in a manner similar to the foregoing embodiment. Thus, when a request of information from the user 10 is received, the information provider 120 examines the number of times of the use by the user 10 by the storage unit 124b and compares it with the number of times stored in the accounting data base 27. When the number of use times reaches the number of times suitable to reduce the accounting amount, the reduced amount corresponding to the number of times shown in the data base is reduced from the accounting amount of the user 10.

The operation as a network is similar to the foregoing operation. The reduced amount can be also charged to the sponsor 30 as necessary.

Figure 7:
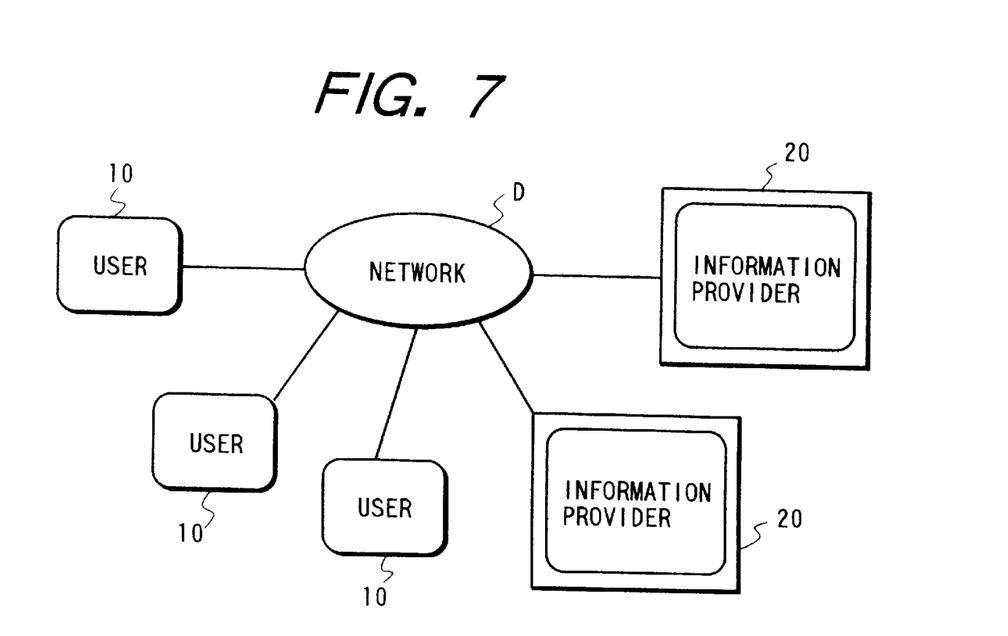
FIG. 7 is a block diagram showing another embodiment of a multimedia communication system.

FIG. 7 shows another embodiment showing a multimedia network without an independent sponsor. In this case as well, when there is the user 10 who repetitively watches the same program, the accounting amount is reduced. The embodiment also incorporates a case where the information provider also serves as a sponsor by broadcasting a self CM or the like.

When the information provider 20 also serves as a sponsor, in response to a request of information from the user 10, the information provider 20 examines the number of use times of the user by the storage unit 24b and compares the number of use times with the number of times stored in the accounting data base 27. When it is equal to the number of times suitable to reduce the accounting amount, the reduced amount corresponding to the number of times shown in the data base is reduced from the accounting amount of the user 10.

Even in case of a network such that the information provider 20 doesn't serve as a sponsor and the network is composed of the ordinary user 10 and the information provider 120 as mentioned above, the information provider 120 operates in a manner similar to the above. In this case, however, the CM insertion unit 123, CM data base 122, and the like in FIG. 6 can be omitted.

According to the embodiment as described above, by reducing the accounting amount when the same user receives the same information a predetermined number of times or more, the use of the information by the user is promoted, so that it can contribute to an increase in profit.

What is claimed is:

1. A terminal device for use by an information provider to provide information, comprising:

(a) first receiving means for receiving a request from an information receiver for the information provider to provide the information to the information receiver, the request including a request that additional information different from the requested information be provided together with the information, wherein the additional information is provided by a sponsor;

(b) receiving means for receiving the additional information from the sponsor;

(c) transmitting means for transmitting the requested information and the additional information to the information receiver;

(d) control means for controlling insertion of the additional information within the information transmitted by the transmitting means; and (e) accounting means for charging said sponsor corresponding to insertion of the additional information by the control means, wherein said sponsor sets a limit of a charge that said accounting means can charge to the sponsor for the additional information regardless of a number of times the additional information is inserted in the information by the control means.

2. A terminal device according to claim 1, wherein said accounting means charges a designated account corresponding to the terminal device which transmitted the additional information.

3. A terminal device according to claim 1, wherein the information provided by the information provider is video on demand information and the additional information is commercial advertisement information.

4. A communication system comprising:

(a) a terminal device for an information receiver for requesting an information provider to provide information and to request that additional information different in kind from the information be included with the information, and for receiving the requested information and the additional information from the information provider;

(b) a terminal device for the information provider for receiving the request from the terminal device for the information receiver, for controlling insertion of the additional information, which is provided by a sponsor, into the requested information, and for providing said requested information and the additional information to the terminal device for the information receiver; and (c) accounting means for charging said sponsor, corresponding to the insertion of the additional information into the information, wherein said sponsor sets a limit of a charge that said accounting means can charge to the sponsor for the additional information regardless of a number of times the additional information is inserted into the information.

5. A system according to claim 4, wherein said accounting means is provided at said terminal device for the information provider.

6. A system according to claim 4, further comprising a terminal device for a sponsor, which is connected to a network and is used by the sponsor to provide the additional information to the terminal device for the information provider.

7. A communication system according to claim 4, wherein the information provided by the information provider is video on demand information and the additional information is commercial advertisement information.

8. A communication system comprising:

(a) a client terminal for selecting a first reception mode for reception of program information or a second reception mode for reception of program information with additional information inserted therein, the additional information being different in kind from the program information;

(b) a first server terminal device for transmitting the program information to said client terminal in both said first reception mode and said second reception mode based on the reception mode selected by said client terminal, and for controlling insertion of the additional information into the program information in the second reception mode; and (c) a second server terminal device for transmitting the additional information to be inserted into the program information in said second reception mode to the client terminal, wherein a charge is charged to said second server terminal for the additional information, the charge being based on the insertion of the additional information into the program information, and the charge that can be charged to the second server terminal being limited by the second server terminal regardless of a number of times the additional information is inserted into the program information.

9. A system according to claim 8, wherein said additional information is advertisement information provided by a sponsor.

10. A communication system according to claim 8, wherein the program information is video on demand information and the additional information is commercial advertisement information.

11. A communication system comprising:

(a) a terminal device for a user for requesting to receive information, for requesting to receive additional information which is different in kind from the information and that is to be inserted into the information, and for receiving the requested information and the additional information;

(b) a terminal device for an information provider for providing said requested information and for controlling insertion of the additional information into the information;

(c) a terminal device for a sponsor to provide the additional information that is inserted into said information provided by said information provider; and (d) accounting means for charging said sponsor an amount of money corresponding to the insertion of the additional information provided by said sponsor into the information, wherein said sponsor sets a limit for a charge that the accounting means can charge the sponsor for the additional information regardless of a number of times the additional information is inserted into the information.

12. A system according to claim 11, wherein said terminal device for the sponsor further comprises output means for outputting account request information in response to a request from said terminal device for the information provider for accounting regarding said additional information.

13. A system according to claim 12, wherein said terminal device for the sponsor further comprises memory means for storing said account request information and an accounting of said additional information.

14. A communication system according to claim 11, wherein the information provided by the information provider is video on demand information and the additional information is commercial advertisement information.

* * * * *